(12) United States Patent
Baba

(10) Patent No.: US 8,953,263 B2
(45) Date of Patent: Feb. 10, 2015

(54) OPTICAL UNIT AND IMAGE PICKUP UNIT

(75) Inventor: Tomohiko Baba, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/982,310

(22) PCT Filed: Jan. 24, 2012

(86) PCT No.: PCT/JP2012/051404
§ 371 (c)(1),
(2), (4) Date: Jul. 29, 2013

(87) PCT Pub. No.: WO2012/105365
PCT Pub. Date: Aug. 9, 2012

(65) Prior Publication Data
US 2013/0308209 A1    Nov. 21, 2013

(30) Foreign Application Priority Data
Jan. 31, 2011 (JP) .................................. 2011-018269

(51) Int. Cl.
G02B 9/34 (2006.01)

(52) U.S. Cl.
USPC ........... 359/780; 359/715; 359/740; 359/771; 359/772

(58) Field of Classification Search
USPC .......................... 359/715, 740, 771, 772, 780
See application file for complete search history.

(56) References Cited

U.S. PATENT DOCUMENTS

2005/0046970 A1 *    3/2005  Amanai ........................ 359/771

* cited by examiner

Primary Examiner — Evelyn A. Lester
(74) Attorney, Agent, or Firm — Dentons US LLP (57) ABSTRACT

An optical unit and an image pickup unit are provided that allow a full angular field to be increased in spite of small size and low cost. An image pickup lens 100 has a first lens 111 with a positive power, a second lens 113 with a positive power, a third lens 114 with a positive power, and a fourth lens 115 with a negative power that are arranged in order from an object side OBJS toward an image surface side, that are arranged in order from the object side toward the image surface side.

7 Claims, 6 Drawing Sheets

OPTICAL UNIT AND IMAGE PICKUP UNIT

TECHNICAL FIELD

The present technology relates to an optical unit and an image pickup unit that are applicable to an image pickup apparatus.

BACKGROUND ART

For an image pickup apparatus to be mounted on a cellular phone, personal computer (PC), and the like in recent years, high resolution, low cost, and small size have been strongly demanded.

A cell pitch in image pickup elements, such as CCD (Charge Coupled Device) and CMOS (Complementary Metal Oxide Semiconductor) image sensor has been dramatically reduced, and high imaging performance with reduced optical aberration, in particular reduced axial chromatic aberration in comparison with a typical optical system has been demanded for an optical system.

At present, an optical system of a four-group/four-piece configuration has been very often adopted in high-end models for a cellular phone. Examples of such lens designs for a camera module have been disclosed in Patent Literatures 1, 2, 3, and the like.

In all of these three examples, a lens design is composed of a first lens with a positive power and a high Abbe number, a second lens with a negative power and a low Abbe number, a third lens with a positive power and a high Abbe number, and a fourth lens having a negative power on axis and a positive power off axis with a high Abbe number. Such a lens design functions to reduce an angle of a light ray incoming into an image pickup element in such a manner that the first lens to the third lens employ a triplet-type power arrangement, and the fourth lens corrects for a distortion aberration and off-axis aberration.

CITATION LIST

Patent Literature

Patent Literature 1: Japanese Unexamined Patent Application Publication No. 2007-219079
Patent Literature 2: Japanese Unexamined Patent Application Publication No. 2008-33376
Patent Literature 3: Japanese Unexamined Patent Application Publication No. 2008-185807

SUMMARY OF THE INVENTION

Meanwhile, for technologies disclosed in Patent Literatures 1, 2, and 3, although a lens design has high imaging performance by virtue of a characteristic of quite a small axial chromatic aberration, the widest full angular field thereof is in the order of 65 degrees at most, and thus it is difficult to achieve a wide field of view.

It is an object of the present technology to provide an optical unit and an image pickup unit that are capable of increasing a full angular field in spite of small size and low cost.

An optical unit in a first viewpoint of the present technology has a first lens with a positive power, a second lens with a positive power, a third lens with a positive power, and a fourth lens with a negative power that are arranged in order from an object side toward an image surface side.

An image pickup unit in a second viewpoint of the present technology has an image pickup element, and an optical unit to produce a subject image on the image pickup element, wherein the optical unit has a first lens with a positive power, a second lens with a positive power, a third lens with a positive power, and a fourth lens with a negative power that are arranged in order from an object side toward an image surface side.

According to the present technology, an advantage of achieving a wider full angular field in spite of small size and low cost is assured.

DESCRIPTION OF EMBODIMENTS

Hereinafter, the embodiments of the present technology are described with reference to the attached drawings. It is to be noted that the descriptions are provided in the order given below.

1. First Embodiment (a first configuration example of an image pickup lens employing an optical unit)
2. Second Embodiment (a second configuration example of an image pickup lens employing an optical unit)
3. Third Embodiment (a configuration example of an image pickup unit)

<1. First Embodiment>

Figure 1:
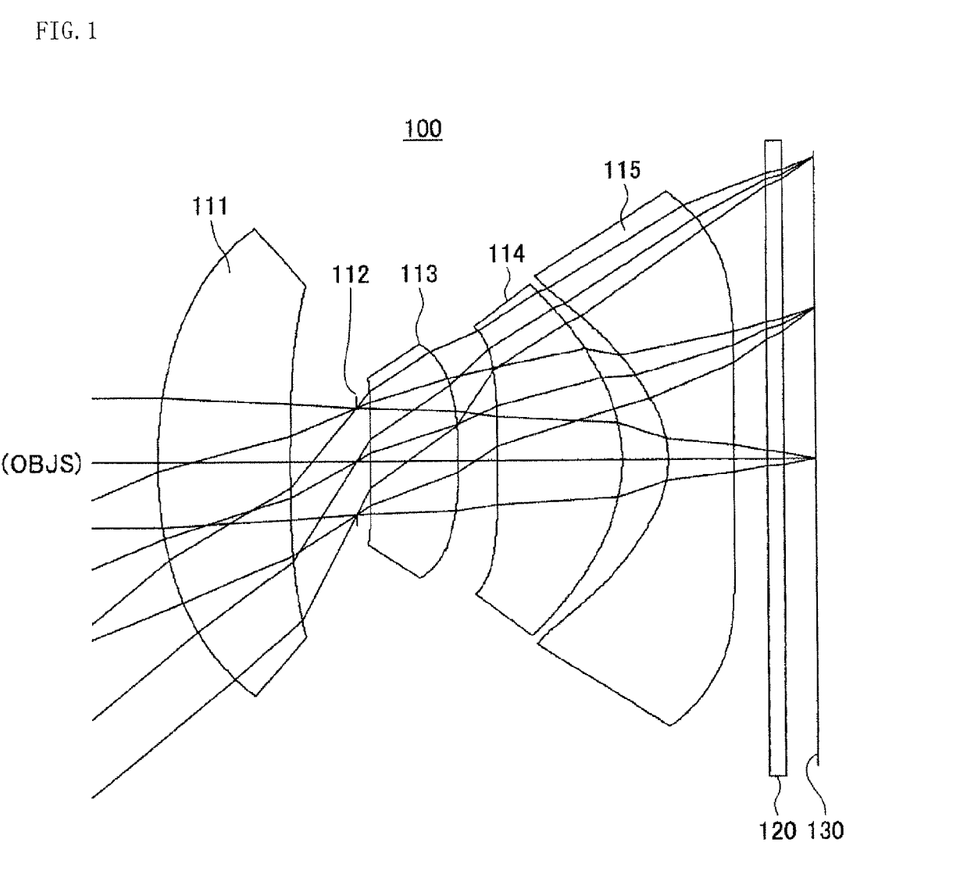
FIG. 1 is a diagram showing a configuration example of an image pickup lens according to a first embodiment.

FIG. 1 is a diagram showing a configuration example of an image pickup lens employing an optical unit according to a first embodiment.

As shown in FIG. 1, an image pickup lens 100 according to the first embodiment has a first lens 111, an aperture 112, a second lens 113, a third lens 114, and a fourth lens 115 that are arranged in order from an object side OBJS toward an image surface side. Further, the image pickup lens 100 also has a cover glass 120, and an imaging surface (hereinafter referred to as an image surface) 130 that are arranged in order from the object side OBJS toward the image surface side. This image pickup lens 100 is formed as a fixed focal length lens.

Further, in the present embodiment, the aperture 112 is arranged between the first lens 111 and the second lens 113.

In the image pickup lens 100 that is a fixed focal length lens, it is assumed that an image pickup surface (image reception area) of a solid-state image pickup element, such as a CCD sensor and a CMOS sensor is arranged on the image surface 130. The cover glass 120 is arranged between the image surface-side surface of the fourth lens 115 and the image surface 130. Between the image surface-side surface of the fourth lens 115 and the image surface 130, any optical element may be arranged in addition to the cover glass 120 that is formed of a resin or glass material, an infrared cutoff filter, a low-pass filter, and the like. Further, in the vicinity of the aperture, any optical component, such as a phasemask, coded aperture, liquid crystal shutter, and variable aperture may be arranged. It is to be noted that, in the present embodiment, in FIG. 1, the left side is an object side (front side) and the right side is an image surface side (rear side). A light flux incoming from the object side is imaged on the image surface 130.

Hereinafter, the descriptions are provided on a configuration and a function of the image pickup lens according to the present embodiment.

The image pickup lens 100 is formed of lenses of a four-group/four-piece configuration. The first lens 111 is formed of a positive power lens. The second lens 113 is formed of a positive power lens. The third lens 114 is formed of a positive power lens. The fourth lens 115 is formed of a negative power lens.

Hereupon, the first lens 111 takes the shape where a curvature radius of the object-side surface is smaller than an absolute value of a curvature radius of the image-side surface. Since the aperture 112 is subsequently arranged, and this is an intermediate aperture as well as the aperture is disposed at the object side, the first lens 111 is configured optimally to correct aberration and reduce an incident angle of a light ray incoming into a sensor. The second lens 113 has a positive power, and the first lens 111 and the second lens 113 take the shape almost symmetrical to the aperture 112 to correct spherical aberration, off-axis coma aberration, astigmatism, and distortion, and thus, the first lens 111 and the second lens 113 take the shape best-suited for a wide-angle lens. However, since only such a configuration is unable to correct chromatic aberration, it is difficult to deal with the microscopic pixel pitch in recent years. Thus, the third lens 114 and the fourth lens 115 correct chromatic aberration. The third lens 114 has a positive power, while the fourth lens 115 has a negative power. An Abbe number vdL3 of the third lens 114 is greater as compared with an Abbe number vdL4 of the fourth lens 115 (vdL4≤vdL3), which satisfies an achromatic condition to correct chromatic aberration. Further, to suppress distortion, the third lens 114 and the fourth lens 115 have a positive power and a negative power that are inverted respectively, although they have almost the same power. As a whole, such a function ensures to possess a capability to correct large aberration that is optimal for a wide-angle lens, and to have a light ray incident angle best-suited for a CMOS sensor or a CCD sensor, thereby achieving a bright lens. The image pickup lens 100 according to the present embodiment has high imaging performance with a four-group configuration, while allowing to achieve an optical system capable of increasing a full angular field up to approximately 80 degrees.

Further, the image pickup lens 100 according to the present embodiment that is a fixed focal length lens is configured to satisfy the following conditional expressions (1) to (4).

The conditional expression (1) is a conditional expression concerning bending of the first lens 111. If a lower limit of the conditional expression (1) is exceeded, the first lens 111 has a resemblance to a biconvex lens, and off-axis coma aberration and astigmatism become large, which makes it difficult to achieve the desirable camera performance. If an upper limit is exceeded, spherical aberration becomes large, which makes it difficult to achieve the desirable camera performance.

[Expression 1]

$$0.66 \leq qL1 \leq 50 \tag{1}$$

qL1: a bending factor of the first lens
qL1=(RL1S2+RL1S1)/(RL1S2−RL1S1)

RL1S1: a curvature radius of a first surface L1S1 of the first lens 111
RL1S2: a curvature radius of a second surface L1S2 of the first lens 111

The conditional expression (2) is a conditional expression concerning a power of the second lens 113. If a lower limit is exceeded, a power becomes too intensive, and a manufacturing tolerance is reduced to deteriorate productivity, and spherical aberration occurs, which makes it difficult to achieve the desirable camera performance. If an upper limit is exceeded, the symmetry to the first lens 111 is lost, and off-axis coma aberration and astigmatism become large, which makes it difficult to achieve the desirable camera performance.

[Expression 2]

$$1.0 \leq f2/f \leq 1000 \tag{2}$$

f: a focal distance of an overall lens system
f2: a focal distance of the second lens The conditional expression (3) is a conditional expression concerning a power ratio of the third lens 114 and the fourth lens 115. If a lower limit is exceeded, correction for chromatic aberration is degraded, and distortion occurs, which makes it difficult to achieve the desirable camera performance. If an upper limit is exceeded, a power of the third lens 114 becomes too intensive, and a manufacturing tolerance is reduced to deteriorate productivity, and at the same time spherical aberration and distortion occur, which makes it difficult to achieve the desirable camera performance.

[Expression 3]

$$-5 \leq f3/f4 \leq -0.4 \tag{3}$$

f3: a focal distance of the third lens
f4: a focal distance of the forth lens

The conditional expression (4) is a conditional expression concerning an Abbe number of the second lens 113. If a lower limit is exceeded, off-axis coma aberration and astigmatism become large, which makes it difficult to achieve the desirable camera performance. For an upper limit, there is no lens material that allows for manufacturing by the use of a mold manufacturing method exceeding the Abbe number of 70, and thus a value is determined accordingly.

[Expression 4]

$$40 \leq vdL2 \leq 70 \tag{4}$$

vdL2: an Abbe number of the second lens

In addition to the conditional expressions (1) to (4), a conditional expression (5) is also satisfied. As described above, the third lens 114 has a positive power, while the fourth lens 115 has a negative power, and the conditional expression (5) is contingent upon that the Abbe number vdL3 of the third lens 114 is greater as compared with the Abbe number vdL4 of the fourth lens 115. This condition becomes an achromatic condition to correct chromatic aberration.

[Expression 5]

$$vdL4 \leq vdL3 \tag{5}$$

The above-described conditional expressions (1) to (5) are common to examples 1 and 2 to be dealt with hereinafter. By adopting those conditional expressions accordingly as appropriate, more preferable imaging performance suitable for the individual image pickup element or image pickup unit and a compact optical system are achieved.

It is to be noted that an aspheric shape of the lens is represented by an expression given below provided that a direction from the object side toward the image surface side is positive, that k is a conical coefficient, that A, B, C, and D are aspheric coefficients, and that r is a central curvature radius. y denotes a height of a light ray above an optical axis, and c denotes an inverse number of the central curvature radius r (1/r). It is to be noted that X denotes a distance from a tangent plane with respect to an aspheric vertex, and that A, B, C, and D denote a fourth-order aspheric coefficient, a sixth-order aspheric coefficient, an eighth-order aspheric coefficient, and a tenth-order aspheric coefficient, respectively.

Aspheric Equation $$X = \frac{cy^2}{1+\sqrt{1-(1+k)c^2y^2}} + Ay^4 + By^6 + Cy^8 + Dy^{10} \quad [\text{Expression 6}]$$

Figure 2:
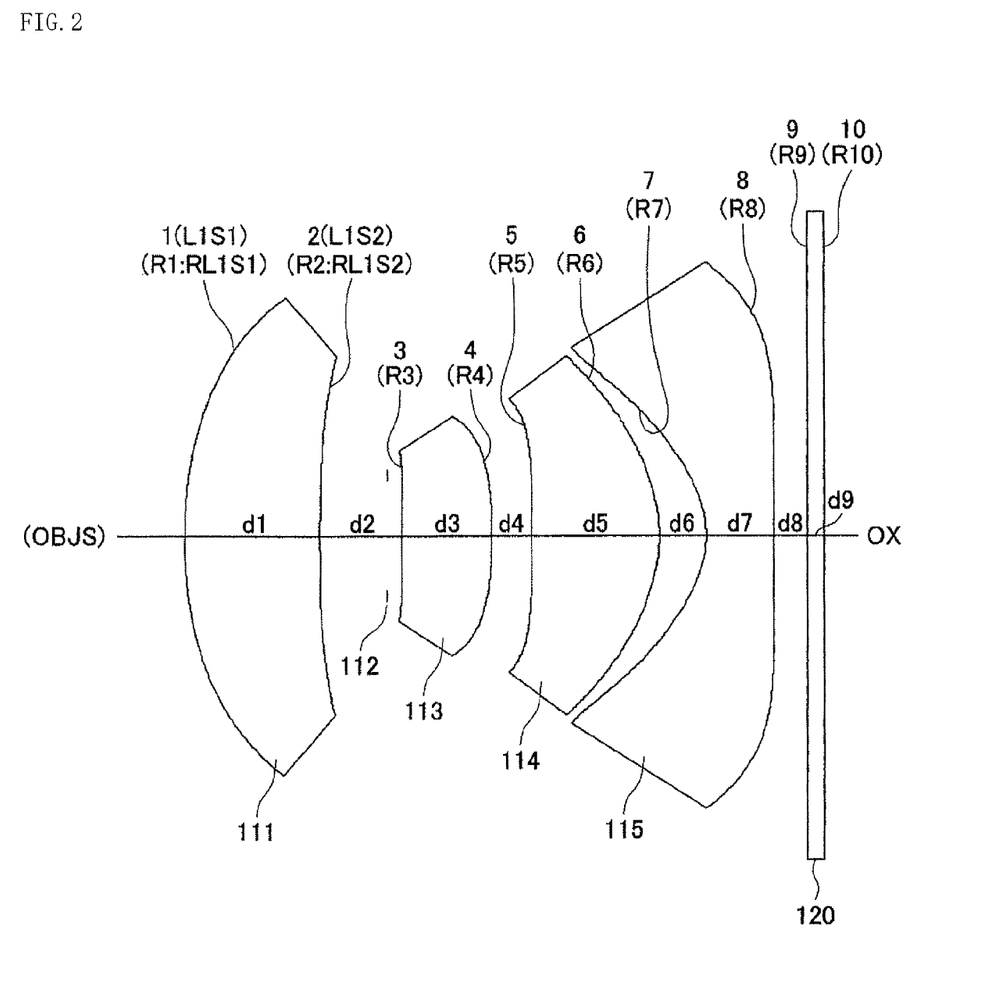
FIG. 2 is a diagram showing surface numeral codes to be assigned to each lens configuring each lens group of the image pickup lens according to the embodiment, a cover glass configuring an image pickup section, and image surfaces.

FIG. 2 is a diagram showing surface numeral codes to be assigned to each lens configuring each lens group of the image pickup lens according to the present embodiment, and a cover glass configuring an image pickup section. It is to be noted that the aperture 112 is not considered in this figure.

In concrete terms, a first surface numeral code is assigned to an object-side surface (convex surface) of the first lens 111, while a second surface numeral code is assigned to an image-side surface of the first lens 111. A third surface numeral code is assigned to an object-side surface of the second lens 113, while a fourth surface numeral code is assigned to an image-side surface of the second lens 113. A fifth surface numeral code is assigned to an object-side surface of the third lens 114, while a sixth surface numeral code is assigned to an image-side surface of the third lens 114. A seventh surface numeral code is assigned to an object-side surface of the fourth lens 115, while an eighth surface numeral code is assigned to an image-side surface of the fourth lens 115. A ninth surface numeral code is assigned to an object-side surface of the cover glass 120, while a tenth surface numeral code is assigned to an image-side surface of the cover glass 120.

Further, as shown in FIG. 2, in the image pickup lens 100 according to the present embodiment, a central curvature radius of the object-side surface (first numeral code) 1 (L1S1) of the first lens 111 is set to R1 (RL1S1). A central curvature radius of the image-side surface 2 (L1S2) of the first lens 111 is set to R2 (RL1S2). A central curvature radius of the object-side surface of the second lens 113 is set to R3, while a central curvature radius of the image-side surface of the second lens 113 is set to R4. A central curvature radius of the object-side surface of the third lens 114 is set to R5, while a central curvature radius of the image-side surface of the third lens 114 is set to R6. A central curvature radius of the object-side surface of the fourth lens 115 is set to R7, while a central curvature radius of the image-side surface of the fourth lens 115 is set to R8. A central curvature radius of the object-side surface 9 of the cover glass 120 is set to R9, while a central curvature radius of the image-side surface of the cover glass 120 is set to r10. It is to be noted that the respective central curvature radiuses R9 and R10 of the surface 9 and the surface 10 are infinite (INFINITY).

Moreover, as shown in FIG. 2, a distance on an optical axis OX between the surface 1 and the surface 2 that is a thickness of the first lens 111 is set to d1, while a distance on the optical axis OX between the image-side surface 2 of the first lens 111 and the object-side surface 3 of the second lens 113 is set to d2. A distance on the optical axis OX between the surface 3 and the surface 4 that is a thickness of the second lens 113 is set to d3, while a distance on the optical axis OX between the image-side surface 4 of the second lens 113 and the object-side surface 5 of the third lens 114 is set to d4. A distance on the optical axis OX between the surface 5 and the surface 6 that is a thickness of the third lens 114 is set to d5, while a distance on the optical axis OX between the image-side surface 6 of the third lens 114 and the object-side surface 7 of the forth lens 115 is set to d6. A distance on the optical axis OX between the surface 7 and the surface 8 that is a thickness of the fourth lens 115 is set to d7, while a distance on the optical axis OX between the image-side surface 8 of the fourth lens 115 and the object-side surface 9 of the cover glass 120 is set to d8. A distance on the optical axis OX between the surface 9 and the surface 10 that is a thickness of the cover glass 120 is set to d9.

Hereinafter, examples 1 and 2 are described. The examples 1 and 2 are design examples of an image pickup lens for a CMOS imager for 3M that has a ⅕ size and 1.4 μm pitch.

EXAMPLE 1

Hereinafter, the example 1 of the image pickup lens is described by citing concrete numerical values. It is to be noted that, in the example 1, the surface numeral codes as shown in FIG. 2 are assigned to each lens configuring the image pickup lens 100 and the cover glass 120 configuring an image pickup section.

As described above, the example 1 in the image pickup lens 100 is a design example of an image pickup lens for a CMOS imager for 3M that has a ⅕ size and 1.4 μm pitch. As shown in FIG. 1 and FIG. 2, the image pickup lens 100 is characterized in that it is configured of the first lens 111 with a positive power, the aperture 112, the second lens 113 with a positive power, the third lens 114 with a positive power, and the fourth lens 115 with a negative power that are arranged in order from an object side toward the object side. The first lens 111 is a positive meniscus lens with a convex surface thereof oriented toward an object side, and has a bending factor of 1.24, taking the shape in which a principal point position thereof comes close to the aperture and which ensures to properly correct off-axis coma aberration and astigmatism. The second lens 113 has a paraxial focal distance of 5.34 mm that is almost equivalent to a paraxial focal distance of 5.33 mm for the first lens 111, and the first lens 111 and the second lens 113 form a symmetrical system to properly correct off-axis coma aberration and astigmatism. The third lens 114 has a paraxial focal distance of 1.14 mm and an Abbe number for d line of 40.1, while the fourth lens 115 has a paraxial focal distance of −0.94 mm and an Abbe number of 29.0. Such a condition becomes an achromatic condition, and absolute values of a power are almost equivalent, which ensures that occurrence of distortion is suppressed. As a whole, such a function ensures to possess a capability to correct large aberration, and achieves a wide field of view with a full-viewing angle of 78 degrees in spite of a bright lens with F no 2.8. Further, the first lens 111 is formed of a plastic material, the second lens 113 is formed of a plastic material, the third lens 114 is formed of a glass material, and the fourth lens 115 is formed of a plastic material. This ensures less temperature dependency of a focal distance and excellent temperature characteristics. This results in a lens suitable for a fixed-focus camera module being achieved.

Numerical values in the example 1 are given in Table 1, Table 2, Table 3, and Table 4. Each of numerical values in the example 1 corresponds to the image pickup lens 100 illustrated in FIG. 1.

Table 1 shows curvature radiuses (R: mm), spacing interval distances (d: mm), refractive indexes (nd), and dispersion values (vd) of each lens, the cover glass configuring an image pickup section, and the image surface that correspond to each surface numeral code for the image pickup lens in the example 1.

TABLE 1

Lens Configuration Data in Example 1

| Surface numerical codes | R | d | nd | vd |
|---|---|---|---|---|
| 1: | 2.568 | 0.802 | 1.531 | 56.0 |
| 2: | 24.305 | 0.488 | | |
| 3: | 40.000 | 0.532 | 1.531 | 56.0 |
| 4: | −3.047 | 0.238 | | |
| 5: | −20.623 | 0.759 | 1.851 | 40.1 |
| 6: | −0.950 | 0.281 | | |
| 7: | −0.553 | 0.400 | 1.585 | 29.0 |
| 8: | 59822.7 | 0.200 | | |
| 9: | INFINITY | 0.100 | 1.517 | 64.2 |
| 10: | INFINITY | 0.200 | | |

Table 2 shows the fourth-order, sixth-order, eighth-order, and tenth-order aspheric coefficients for the surfaces 1 and 2 of the first lens 111, the surfaces 3 and 4 of the second lens 113, the surfaces 5 and 6 of the third lens 114, and the surfaces 7 and 8 of the fourth lens 115 in the example 1. In Table 2, K denotes a conical coefficient, and A, B, C, and D denote the fourth-order aspheric coefficient, the sixth-order aspheric coefficient, the eighth-order aspheric coefficient, and the tenth-order aspheric coefficient, respectively.

TABLE 2

Aspheric Data in Example 1

| | | | | |
|---|---|---|---|---|
| First surface | K: −0.530 | A: 0.276E−01 | B: 0.118E−01 | C: −0.340E−02 | D: 0.198E−02 |
| Second surface | K: 1.000 | A: 0.117E+00 | B: −0.992E−01 | C: 0.631E−01 | D: −0.190E−01 |
| Third surface | K: 0.875 | A: −0.192E+00 | B: −0.281E+00 | C: −0.203E+01 | D: 0.597E+01 |
| Fourth surface | K: −1.000 | A: −0.352E+00 | B: 0.251E−01 | C: −0.136E+01 | D: 0.240E+00 |
| Fifth surface | K: −0.875 | A: −0.177E+00 | B: 0.835E−02 | C: −0.247E−01 | D: −0.425E+00 |
| Sixth surface | K: −0.767 | A: 0.128E+00 | B: −0.452E−01 | C: −0.763E−01 | D: 0.600E−01 |
| Seventh surface | K: −1.000 | A: 0.676E+00 | B: −0.858E+00 | C: 0.410E+00 | D: −0.223E−01 |
| Eighth surface | K: −1.000 | A: 0.300E−01 | B: −0.682E−01 | C: 0.183E−01 | D: −0.217E−02 |

Table 3 concretely shows a focal distance f, a numerical aperture F, a half angular field ω, and a lens length H for the image pickup lens 100 in the example 1. Here, the focal distance f is set to 2.25 [mm], the numerical aperture F is set to 2.8, the half angular field ω is set to 39.0 degrees, and the lens length H is set to 4.0 [mm]

TABLE 3

Configuration Data in Example 1 f (focal distance) = 2.25 mm
F (numerical aperture) = 2.8
ω (half angular field) = 39.0 degrees
H (overall lens length) = 4.0 mm Table 4 shows that each of the above-described conditional expressions (1) to (4) is satisfied in the example 1.

TABLE 4

Values of Conditional Expressions in Example 1

| Conditional expressions/example | | 1 |
|---|---|---|
| (1) | qL1 | 1.24 |
| (2) | f2/f | 2.37 |
| (3) | f3/f4 | −1.12 |
| (4) | vdL2 | 56.0 |

As shown in Table 4, in the example 1, a bending factor qL1 of the first lens 111 is set to 1.24 to satisfy the condition defined by the conditional expression (1). A power f2/f of the second lens 113 is set to 2.37 to satisfy the condition defined by the conditional expression (2). A power ratio f3/f4 of the third lens 114 to the fourth lens 115 is set to −1.12 to satisfy the condition defined by the conditional expression (3). An Abbe number vdL2 of the second lens 113 is set to 56.0 to satisfy the condition defined by the conditional expression (4).

Figure 3:
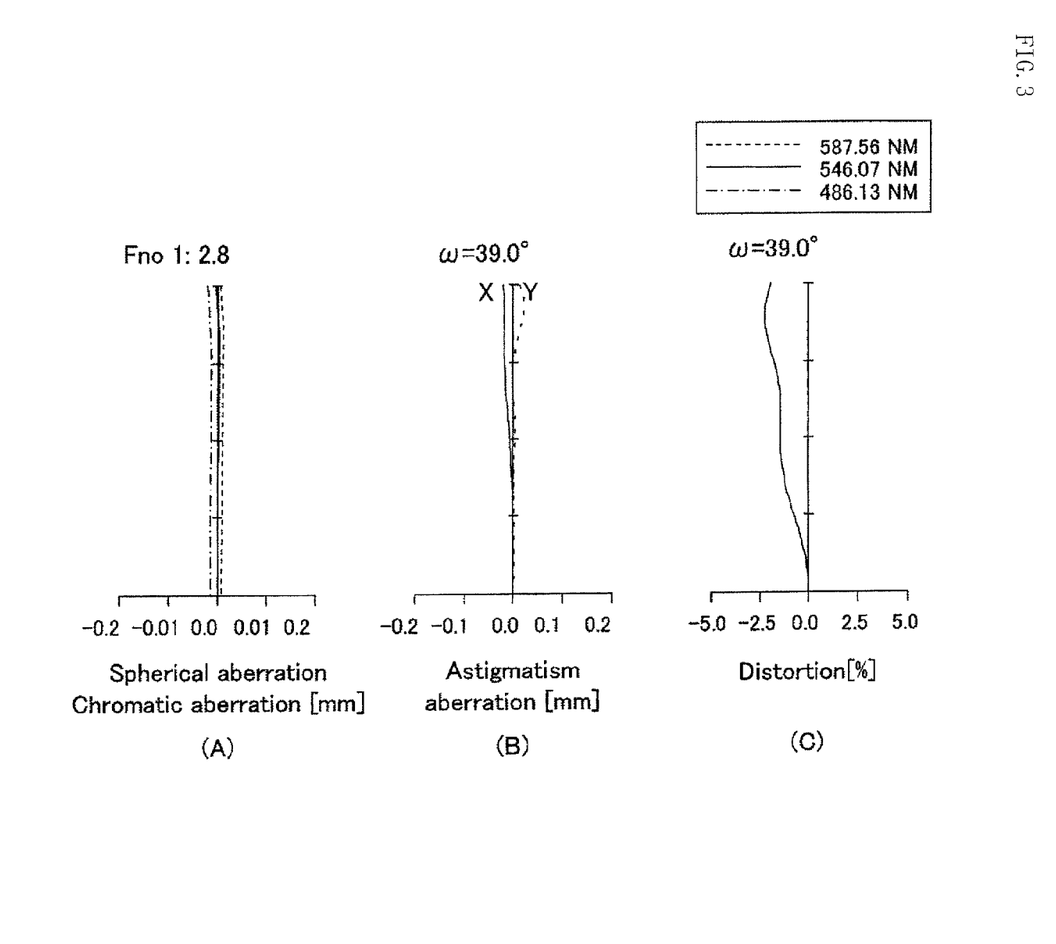
FIG. 3 is an aberration diagram showing spherical aberration, astigmatism, and distortion aberration in an example 1.

FIG. 3 is an aberration diagram showing spherical aberration (chromatic aberration), astigmatism, and distortion aberration in the example 1. FIGS. 3(A), 3(B), and 3(C) show spherical aberration (chromatic aberration), astigmatism, and distortion aberration, respectively. As seen from FIG. 3, according to the example 1, the spherical, astigmatism, and distortion aberrations are excellently corrected to ensure that an image pickup lens including an optical unit with the superior imaging performance is achieved.

<2. Second Embodiment>

Figure 4:
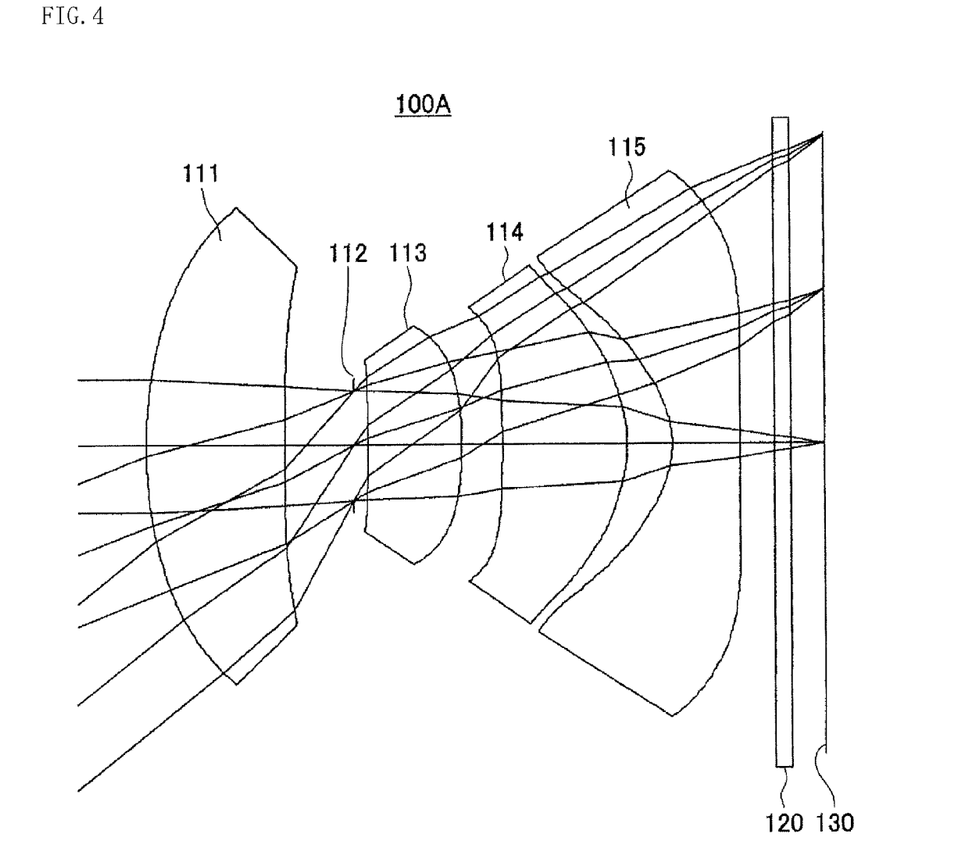
FIG. 4 is a diagram showing a configuration example of an image pickup lens according to a second embodiment.

FIG. 4 is a diagram showing a configuration example of an image pickup lens according to a second embodiment.

An image pickup lens 100A according to the second embodiment as illustrated in FIG. 4 and the image pickup lens 100 according to the first embodiment as illustrated in FIG. 1 are identical in the basic configuration, although setting values such as parameters for each of component parts are different from each other as represented in an example 2. Therefore, detailed description on the image pickup lens 100A is omitted here.

Hereinafter, the example 2 of the image pickup lens is described by citing concrete numerical values. It is to be noted that, in the example 2, the surface numeral codes as shown in FIG. 2 are assigned to each lens configuring the image pickup lens 100A and the cover glass 120 configuring an image pickup section.

EXAMPLE 2

As described above, the example 2 in the image pickup lens 100A is a design example of an image pickup lens for a CMOS imager for 3M that has a ⅕ size and 1.4 μm pitch. As shown in FIG. 4, the image pickup lens 100A is characterized in that it is configured of a first lens 111 with a positive power, an aperture 112, a second lens 113 with a positive power, a third lens 114 with a positive power, and a fourth lens 115 with a negative power that are arranged in order from an object side toward the object side. The first lens 111 is a positive meniscus lens with a convex surface thereof oriented toward the object side, and has a bending factor of 1.004, taking the shape in which a principal point position thereof comes close to an aperture and which ensures to properly correct off-axis coma aberration and astigmatism. The second lens 113 has a paraxial focal distance of 4.27 mm that is almost equivalent to a paraxial focal distance of 5.29 mm for the first lens 111, and the first lens 111 and the second lens 113 form a symmetrical system to properly correct off-axis coma aberration and astigmatism. The third lens 114 has a paraxial focal distance of 1.17 mm and an Abbe number for d line of 37.3, while the fourth lens 115 has a paraxial focal distance of −0.91 mm and an Abbe number of 29.0. Such a condition becomes an achromatic condition, and absolute values of a power are almost equivalent, which ensures that occurrence of distortion is suppressed. As a whole, such a function ensures to possess a capability to correct large aberration, and achieves a wide field of view with a full-viewing angle of 77.4 degrees in spite of a bright lens with Fno 2.8. Further, the first lens 111 is formed of a plastic material, the second lens 113 is formed of a plastic material, the third lens 114 is formed of a glass material, and the fourth lens 115 is formed of a plastic material. This ensures less temperature dependency of a focal distance and excellent temperature characteristics. This results in a lens suitable for a fixed-focus camera module being achieved.

Numerical values in the example 2 are given in Table 5, Table 6, Table 7, and Table 8. Each of numerical values in the example 2 corresponds to the image pickup lens 100A illustrated in FIG. 5.

Table 5 shows curvature radiuses (R: mm), spacing interval distances (d: mm), refractive indexes (nd), and dispersion values (vd) of each lens, the cover glass configuring an image pickup section, and the image surface that correspond to each surface numeral code for the image pickup lens in the example 2.

TABLE 5

Configuration Data in Example 2

| Surface numerical codes | R | d | nd | vd |
|---|---|---|---|---|
| 1: | 2.809 | 0.813 | 1.531 | 56.0 |
| 2: | 1592.2 | 0.487 | | |
| 3: | 64.816 | 0.558 | 1.531 | 56.0 |
| 4: | −2.347 | 0.240 | | |
| 5: | −11.603 | 0.734 | 1.834 | 37.3 |
| 6: | −0.935 | 0.268 | | |
| 7: | −0.538 | 0.400 | 1.585 | 29.0 |
| 8: | −1100.0 | 0.200 | | |
| 9: | INFINITY | 0.100 | 1.517 | 64.2 |
| 10: | INFINITY | 0.200 | | |

Table 6 shows the fourth-order, sixth-order, eighth-order, and tenth-order aspheric coefficients for the surfaces 1 and 2 of the first lens 111, the surfaces 3 and 4 of the second lens 113, the surfaces 5 and 6 of the third lens 114, and the surfaces 7 and 8 of the fourth lens 115 in the example 2. In Table 6, K denotes a conical coefficient, and A, B, C, and D denote the fourth-order aspheric coefficient, the sixth-order aspheric coefficient, the eighth-order aspheric coefficient, and the tenth-order aspheric coefficient, respectively.

TABLE 6

Aspheric Data in Example 2

| | | | | | |
|---|---|---|---|---|---|
| First surface | K: −0.451 | A: 0.264E−01 | B: 0.857E−02 | C: −0.145E−02 | D: 0.101E−02 |
| Second surface | K: 1.000 | A: 0.119E+00 | B: −0.969E−01 | C: 0.561E−01 | D: −0.152E−01 |
| Third surface | K: 1.000 | A: −0.223E+00 | B: 0.161E+00 | C: −0.637E+01 | D: 0.173E+02 |
| Fourth surface | K: 0.451 | A: −0.387E+00 | B: −0.164E+00 | C: −0.784E+00 | D: −0.671E+00 |
| Fifth surface | K: −1.000 | A: −0.202E+00 | B: −0.189E+00 | C: 0.192E+00 | D: −0.671E+00 |
| Sixth surface | K: −0.850 | A: 0.154E+00 | B: −0.209E+00 | C: −0.235E−01 | D: 0.110E+00 |
| Seventh surface | K: −1.000 | A: 0.823E+00 | B: −0.149E+01 | C: 0.114E+01 | D: −0.257E+00 |
| Eighth surface | K: −1.000 | A: 0.469−01 | B: −0.114E+00 | C: 0.458E−01 | D: −0.700E−02 |

Table 7 concretely shows a focal distance f, a numerical aperture F, a half angular field ω, and a lens length H for the image pickup lens 100A in the example 2. Here, the focal distance f is set to 2.26 [mm], the numerical aperture F is set to 2.8, the half angular field ω is set to 38.7 degrees, and the lens length H is set to 4.0 [mm]

TABLE 7

Configuration Data in Example 2 f (focal distance) = 2.26 mm
F (numerical aperture) = 2.8
ω (half angular field) = 38.7 degrees
H (overall lens length) = 4.0 mm Table 8 shows that each of the above-described conditional expressions (1) to (4) is satisfied in the example 2.

TABLE 8

Values of Conditional Expressions in Example 2

| Conditional expressions/example | | 2 |
|---|---|---|
| (1) | qL1 | 1.004 |
| (2) | f2/f | 1.89 |
| (3) | f3/f4 | −1.29 |
| (4) | vdL2 | 56.0 |

As shown in Table 8, in the example 2, a bending factor qL1 of the first lens 111 is set to 1.004 to satisfy the condition defined by the conditional expression (1). A power f2/f of the second lens 113 is set to 1.89 to satisfy the condition defined by the conditional expression (2). A power ratio f3/f4 of the third lens 114 to the fourth lens 115 is set to −1.29 to satisfy the condition defined by the conditional expression (3). An Abbe number vdL2 of the second lens 113 is set to 56.0 to satisfy the condition defined by the conditional expression (4).

Figure 5:
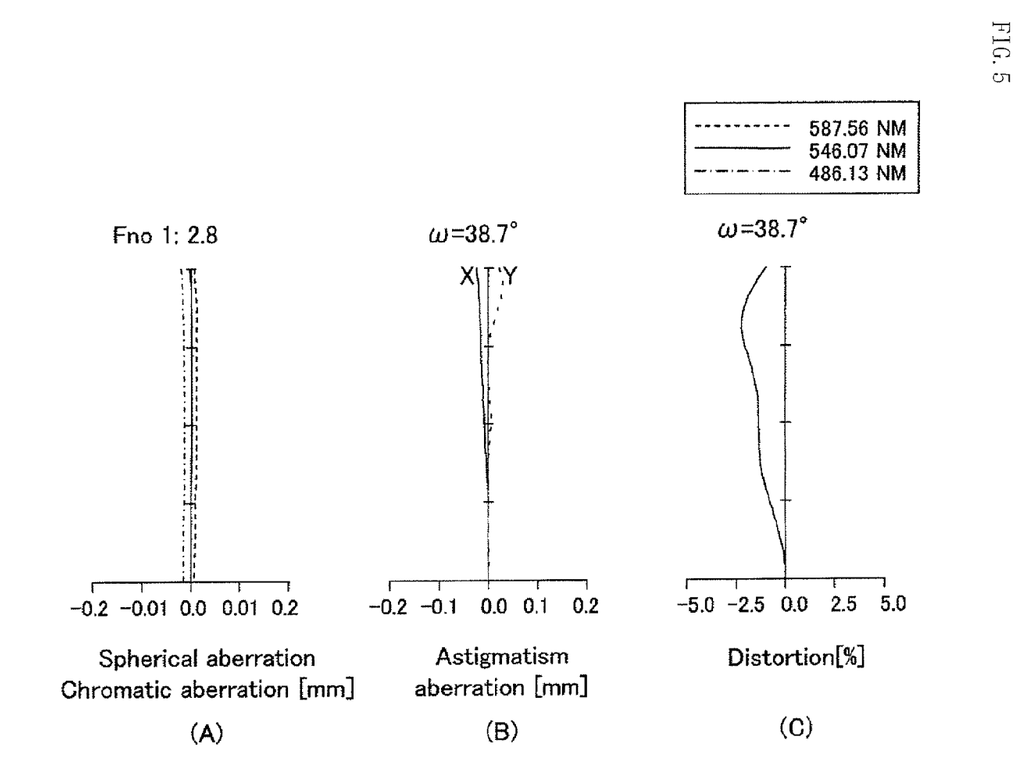
FIG. 5 is an aberration diagram showing spherical aberration, astigmatism, and distortion aberration in an example 2.

FIG. 5 is an aberration diagram showing spherical aberration (chromatic aberration), astigmatism, and distortion aberration in the example 2. FIGS. 5(A), 5(B), and 5(C) show spherical aberration (chromatic aberration), astigmatism, and distortion aberration, respectively. As seen from FIG. 5, according to the example 2, the spherical, astigmatism, and distortion aberrations are excellently corrected to ensure that an image pickup lens including an optical unit with the superior imaging performance is achieved.

According to the above-described embodiments, it is possible to achieve effects given below.

Each of the image pickup lenses 100 and 100A according to these embodiments is characterized in that it is formed of the first lens 111 with a positive power, the aperture 112, the second lens 113 with a positive power, the third lens 114 with a positive power, and the fourth lens 115 with a negative power that are arranged in this order from an object side toward the object side. The first lens 111 and the second lens 113 take the shape almost symmetrical to the aperture 112 to correct spherical aberration, off-axis coma aberration, astigmatism, and distortion, and therefore, the first lens 111 and the second lens 113 take the shape best-suited for a wide-angle lens. However, since only such a configuration is unable to correct chromatic aberration, the third lens 114 and the fourth lens 115 correct chromatic aberration under the condition that the third lens 114 has a positive power, that the fourth lens 115 has a negative power, and that an Abbe number of the third lens is greater than that of the fourth lens. Such a condition satisfies an achromatic condition to correct chromatic aberration. Further, to suppress distortion, the third lens 114 and the fourth lens 115 have a positive power and a negative power that are inverted respectively, although they have almost the same power. As a whole, such a function ensures to possess a capability to correct large aberration that is optimal for a wide-angle lens, and to have a light ray incident angle best-suited for a CMOS sensor or a CCD sensor, thereby achieving a bright lens. Such image pickup lenses have high imaging performance with a four-group configuration, while allowing to achieve an optical system capable of increasing a full angular field up to approximately 80 degrees, which makes it possible to achieve a small-sized and compact wide-angle lens. For example, it is possible to increase a wide-angle field of view up to about 23 mm in terms of a single lens. Further, it is possible to suppress the optical distortion down to about 2.2 [%]. It is possible to suppress temperature defocusing in a PPGP configuration. It is possible to suppress axial chromatic aberration. The image pickup lenses are best suited for bar-code reading by virtue of greater depth of field and absence of the temperature defocusing.

The image pickup lenses 100 and 100A having features as described above are applicable to a digital camera utilizing image pickup elements such as CCD and CMOS sensor, in particular, as lenses for a camera to be mounted on a small-sized electronic apparatus such as a cellular phone.

<3. Third Embodiment>

Figure 6:
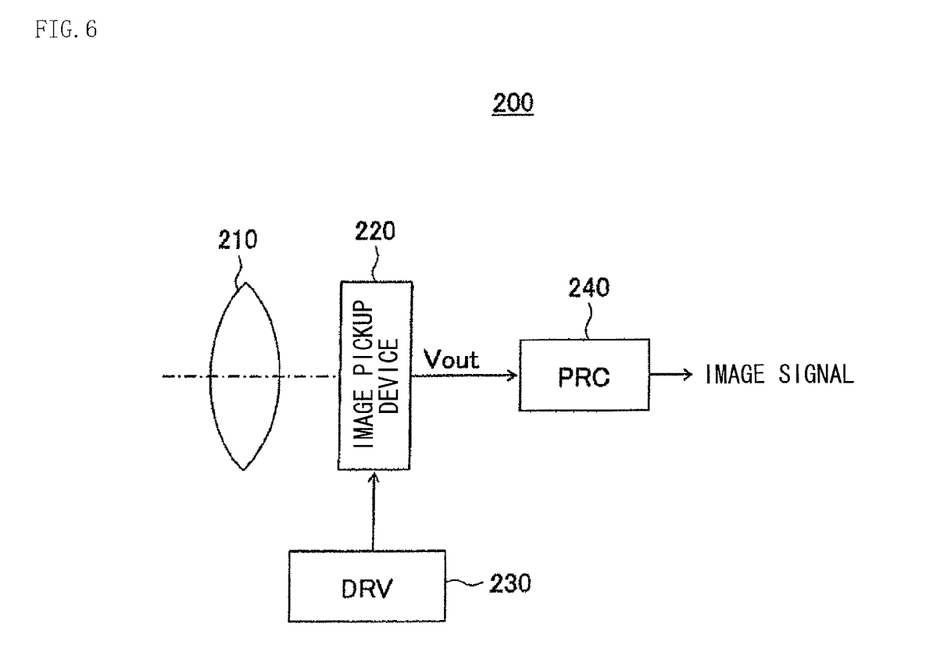
FIG. 6 is a block diagram showing a configuration example of an image pickup unit in which the image pickup lens according to the embodiment is employed.

FIG. 6 is a block diagram showing a configuration example of an image pickup unit in which the image pickup lenses including the optical unit according to any of the embodiments is employed.

As shown in FIG. 6, the image pickup unit 200 has an optical system 210 to which any of the image pickup lenses 100 and 100A according to the embodiments is applicable, and an image pickup device 220 to which a CCD or CMOS image sensor (solid-state image pickup element) is applicable. The optical system 210 guides incident light to an image pickup surface including a pixel region of the image pickup device 220 for imaging a subject image. The image pickup unit 200 also has a driving circuit (DRV) 230 driving the image pickup device 220, and a signal processing circuit (PRC) 240 processing an output signal of the image pickup device 220.

The driving circuit 230 has a timing generator (not shown in the figure) generating various timing signals including a start pulse and a clock pulse for driving circuits within the image pickup device 220, and drives the image pickup device 220 using predetermined timing signals.

On the other hand, the signal processing circuit 240 performs predetermined signal processing on an output signal of the image pickup device 220. Image signals processed by the signal processing circuit 240 are recorded on a recording medium such as a memory. Image information recorded on the recording medium is printed as a hard copy using a printer and the like. In addition, the image signals processed by the signal processing circuit 240 are displayed as motion images on a monitor that is configured of a liquid crystal display and the like.

As described above, by mounting any of the above-described image pickup lenses 100 and 100A as the optical system 210 in an image pickup apparatus such as a digital still camera, it is possible to achieve a camera with low power consumption and high accuracy.

It is to be noted that the present technology may be also configured as follows.

[1] An optical unit including:
  a first lens with a positive power,
  a second lens with a positive power,
  a third lens with a positive power, and
  a fourth lens with a negative power that are arranged in order from an object side toward an image surface side.

[2] The optical unit according to [1], wherein a bending factor qL1=(RL1S2+RL1S1)/(RL1S2−RL1S1) of the first lens and the second lens satisfy the following conditional expressions:

$$0.66 \leq qL1 \leq 50 \tag{1}$$

$$1.0 \leq f2/f \leq 1000 \tag{2}$$

where qL1 is a bending factor of the first lens,
RL1S1 is a curvature radius of a first surface L1S1 of the first lens 111,
RL1S2 is a curvature radius of a second surface L1S2 of the first lens 111,
f2 is a focal distance of the second lens, and
f is a focal distance of an optical system.

[3] The optical unit according to [1] or [2], wherein the third lens and the fourth lens satisfy the following conditional expression:

$$-5 \leq f3/f4 \leq -0.5 \quad (3)$$

where f3 is a focal distance of the third lens, and
f4 is a focal distance of the forth lens.

[4] The optical unit according to any one of [1] to [3], wherein an Abbe number vdL2 of the second lens satisfies the following conditional expression.

$$40 \leq vdL2 \leq 70 \quad (4)$$

[5] The optical unit according to any one of [1] to [4], wherein an Abbe number vdL3 of the third lens and an Abbe number vdL4 of the fourth lens satisfy the following conditional expression.

$$vdL3 \leq vdL4 \quad (5)$$

[6] The optical unit according to any one of [1] to [5], wherein the first lens is formed of a plastic material, the second lens is formed of a plastic material, the third lens is formed of a glass lens, and the fourth lens is formed of a plastic material.

[7] The optical unit according to any one of [1] to [6], wherein an aperture is arranged between the first lens and the second lens.

The invention claimed is:

1. An optical unit comprising:
   a first lens with a positive power;
   a second lens with a positive power;
   a third lens with a positive power;
   a fourth lens with a negative power; and
   an aperture arranged between the first lens and the second lens,
   wherein,
      the first lens, the aperture, the second lens, the third lens, and the fourth lens are arranged in that order from an object side toward an image surface side, and
      the first lens and the second lens have shapes that are substantially symmetrical with respect to the aperture.

2. The optical unit according to claim 1, wherein a bending factor $qL1=(RL1S2+RL1S1)/(RL1S2-RL1S1)$ of the first lens and the second lens satisfy the following conditional expressions:

$$0.66 \leq qL1 \leq 50 \quad (1)$$

$$1.0 \leq f2/f \leq 1000 \quad (2)$$

where qL1 is the bending factor of the first lens,
RL1S1 is a curvature radius of a first surface L1S1 of the first lens,
RL1S2 is a curvature radius of a second surface L1S2 of the first lens,
f2 is a focal distance of the second lens, and
f is a focal distance of an optical system.

3. The optical unit according to claim 2, wherein the third lens and the fourth lens satisfy the following conditional expression:

$$-5 \leq f3/f4 \leq -0.5 \quad (3)$$

where f3 is a focal distance of the third lens, and f4 is a focal distance of the forth lens.

4. The optical unit according to claim 3, wherein an Abbe number vdL2 of the second lens satisfies the following conditional expression $$40 \leq vdL2 \leq 70 \quad (4).$$

5. The optical unit according to claim 4, wherein an Abbe number vdL3 of the third lens and an Abbe number vdL4 of the fourth lens satisfy the following conditional expression $$vdL4 \leq vdL3 \quad (5).$$

6. The optical unit according to claim 5, wherein the first lens is formed of a plastic material, the second lens is formed of a plastic material, the third lens is formed of a glass lens, and the fourth lens is formed of a plastic material.

7. An image pickup unit comprising:
   an image pickup elements; and
   an optical unit imaging a subject image onto the image pickup element, the optical unit including:
      a first lens with a positive power,
      a second lens with a positive power,
      a third lens with a positive power,
      a fourth lens with a negative power, and
      an aperture arranged between the first lens and the second lens,
      wherein,
         the first lens, the aperture, the second lens, the third lens, and the fourth lens are arranged in that order from an object side toward an image surface side, and
         the first lens and the second lens have shapes that are substantially symmetrical with respect to the aperture.

* * * * *